United States Patent
Grossschmidt et al.

(10) Patent No.: US 9,517,461 B2
(45) Date of Patent: Dec. 13, 2016

(54) FERROUS ZEOLITE, METHOD FOR PRODUCING FERROUS ZEOLITES, AND METHOD FOR CATALYTICALLY REDUCING NITROUS OXIDES

(75) Inventors: Dirk A. Grossschmidt, Mannheim (DE); Bilge Yilmaz, New York, NY (US); Dirk Klingler, Mannheim (DE); Bernd Zoels, Obrigheim (DE)

(73) Assignee: BASF SE, Ludwigshafen (DE)

(*) Notice: Subject to any disclaimer, the term of this patent is extended or adjusted under 35 U.S.C. 154(b) by 667 days.

(21) Appl. No.: 13/516,865

(22) PCT Filed: Dec. 13, 2010

(86) PCT No.: PCT/EP2010/069476
§ 371 (c)(1),
(2), (4) Date: Jun. 18, 2012

(87) PCT Pub. No.: WO2011/073123
PCT Pub. Date: Jun. 23, 2011

(65) Prior Publication Data
US 2013/0004398 A1  Jan. 3, 2013

Related U.S. Application Data

(60) Provisional application No. 61/287,718, filed on Dec. 18, 2009.

(51) Int. Cl.
| | |
|---|---|
| *B01J 29/06* | (2006.01) |
| *B01J 37/02* | (2006.01) |
| *B01J 29/85* | (2006.01) |
| *B01J 29/76* | (2006.01) |
| *B01J 29/072* | (2006.01) |
| *B01D 53/94* | (2006.01) |
| *B01J 37/08* | (2006.01) |
| *B01J 35/10* | (2006.01) |
| *B01J 35/00* | (2006.01) |

(52) U.S. Cl.
CPC ........ *B01J 37/0238* (2013.01); *B01D 53/9427* (2013.01); *B01J 29/072* (2013.01); *B01J 29/76* (2013.01); *B01J 29/763* (2013.01); *B01J 29/7615* (2013.01); *B01J 29/85* (2013.01); *B01J 37/0234* (2013.01); *B01D 2251/2062* (2013.01); *B01D 2255/20738* (2013.01); *B01D 2255/50* (2013.01); *B01J 35/0073* (2013.01); *B01J 35/1014* (2013.01); *B01J 35/1019* (2013.01); *B01J 35/1057* (2013.01); *B01J 37/086* (2013.01); *Y02C 20/10* (2013.01)

(58) Field of Classification Search
USPC .................................................. 502/74, 214
See application file for complete search history.

(56) References Cited

U.S. PATENT DOCUMENTS

| | | | |
|---|---|---|---|
| 2,533,071 A | 12/1950 | Vesterdal et al. | |
| 4,003,850 A | 1/1977 | Callighan et al. | |
| 4,961,917 A | 10/1990 | Byrne | |
| 5,077,026 A * | 12/1991 | Nair ..................... | C10G 2/334 423/326 |
| 2010/0172828 A1 | 7/2010 | Althoff et al. | |
| 2010/0322847 A1 | 12/2010 | Xiao et al. | |
| 2011/0124933 A1 | 5/2011 | Kiesslich et al. | |
| 2011/0312950 A1 | 12/2011 | Eckhardt et al. | |
| 2011/0319251 A1 | 12/2011 | Yilmaz et al. | |
| 2012/0004465 A1 | 1/2012 | Yilmaz et al. | |
| 2012/0016045 A1 | 1/2012 | Yilmaz et al. | |
| 2012/0203045 A1 | 8/2012 | Coelho Tsou et al. | |
| 2012/0208691 A1 | 8/2012 | Bull et al. | |

FOREIGN PATENT DOCUMENTS

| | | |
|---|---|---|
| CN | 101099932 | 1/2008 |
| DE | 1145152 | 3/1963 |
| EP | 0140365 | 5/1985 |
| EP | 0955080 | 7/2002 |
| EP | 1754527 | 2/2007 |
| WO | WO-98/57743 | 12/1998 |

(Continued)

OTHER PUBLICATIONS

Nagy et al., "Nickel and Iron Carbonyl Decompostion on Zeolites and Alumina: Surface Complexes Detected by 13C-NMR Spectroscopy", J. of Catal. 58, 230, 1979, pp. 591-596.*
Perez-Ramirez et al., "Framework Composition Effects on the Performance of Steam-Activated FeMFI Zeolites in the N2O-Mediated Propane Oxidative Dehydrogenation to Propylene", J. Phys. Chem B 2005, 109, 20529-20538.*
Pieterse et al., "Evaluation of Fe-Zeolite Catalysts Prepared by Different Methods for the Decomposition of N2O", Applied Catalysis B: Environmental 51 (2004), 215-228.*
Hensen et al., "Iron Clusters Occluded in Zeolite ZSM5 Micropores", Chemistry for Sustainable Development, 11, 2003, 31-35.*
Xue, Ruredn, et al., Structures and Synthesis of Zeolite Molecular Sieves, *Jilian University Press, 1st ed.* Aug. 1987, 1 page.
International Search Report in PCT/EP2010/069476, mailed on Jul. 14, 2011, 5 pgs.
Machine Translation of DE1145152, Mar. 1963.
Bein, T. et al., "Interaction Between Zeolites and Cluster Compounds. Part 2.—Thermal Decomposition of Iron Pentacarbonyl on Zeolites", *Journal of the Chemical Society, vol. 80* 1984, pp. 1391-1407.

(Continued)

*Primary Examiner* — Elizabeth Wood
(74) *Attorney, Agent, or Firm* — Oblon, McClelland, Maier & Neustadt, L.L.P.

(57) ABSTRACT

Described is an iron-containing zeolite wherein the number of iron sites, based on the zeolite, is greater than the number of cationic positions in the zeolite. Also described is an iron-containing zeolite preparable by gas phase reaction with iron pentacarbonyl, said zeolite having a greater specific surface area than iron-containing zeolites prepared analogously by ion exchange and/or being more hydrothermally stable than iron-containing zeolites prepared analogously by ion exchange, or wherein the number of iron clusters larger than 10 nm is less than 15% by weight, based on the total amount of iron. Further described is a process for preparing an iron-containing zeolitic material, which comprises doping with iron by means of a gas phase reaction using iron pentacarbonyl. Further described is a process for catalytic reduction of nitrogen oxides using catalysts comprising said iron-containing zeolitic materials.

15 Claims, No Drawings

(56) References Cited

FOREIGN PATENT DOCUMENTS

| | | |
|---|---|---|
| WO | WO-00/72965 | 12/2000 |
| WO | WO-2008/132452 | 11/2008 |
| WO | WO-2008/141823 | 11/2008 |
| WO | WO-2009/124902 | 10/2009 |

OTHER PUBLICATIONS

Bein, T. et al., "Photolytic and Thermolytic Decomposition Products From Iron Pentacarbonyl Adsorbed on Y Zeolite", *Zeolites, vol. 5, No. 4* 1984, p. 240.

Capek, L. et al., "Analysis of Fe species in zeolites by UV-VIS-NIR, IR spectra and voltammetry. Effect of preparation, Fe loading and zeolite type", *Microporous and Mesoporous Materials, vol. 80* 2005, pp. 279-289.

Coombs, Douglas S. et al., "Recommended Nomenclature for Zeolite Minerals: Report of the Subcommittee on Zeolites of the International Mineralogical Association, Commission on New Minerals and Mineral Names", *The Canadian Mineralogist, vol. 35* 1997, pp. 1571-1606.

Delahay, G. et al., "Selective Catalytic Reduction of Nitrous Oxide by Ammonia on Iron Zeolite Beta Catalysts in an Oxygen Rich Atmosphere: Effect of Iron Contents", *Journal of Catalysis, vol. 202, No. 1* 2001, pp. 156-162.

Hammer, H. et al., "New Zeolites in Fischer-Tropsch Synthesis", *International Journal of Energy Research, vol. 18* 1994, pp. 223-231.

Lars, T. et al., "An X-Ray Photoelectron Study of Metal Clusters in Zeolites", *The Journal of Physical Chemistry, vol. 93, No. 12* 1989, pp. 4913-4920.

Long, R. Q. et al., "Selective Catalytic Reduction of NO with Ammonia over $Fe^{3+}$-Exchanged Mordenite (Fe-MOR): Catalytic Performance, Characterization, and Mechanistic Study", *Journal of Catalysis, vol. 207, No. 2* 2002, pp. 274-285.

\* cited by examiner

FERROUS ZEOLITE, METHOD FOR PRODUCING FERROUS ZEOLITES, AND METHOD FOR CATALYTICALLY REDUCING NITROUS OXIDES

CROSS-REFERENCE TO RELATED APPLICATIONS

This application is the national stage entry of PCT/EP2010/069476, filed on Dec. 13, 2010, which claims priority to U.S. Patent Application No. 61/287,718, filed on Dec. 18, 2009, the disclosures of which are incorporated herein by reference in their entireties.

FIELD

Embodiments of the present invention relate to iron-containing zeolitic materials, processes for their preparation, and catalysts comprising such zeolitic materials.

BACKGROUND

The prior art includes a large amount of literature about the use of metal-containing zeolite materials as catalysts or as adsorbents. For example, metal-doped zeolite materials are used as catalysts in the selective catalytic reduction (SCR) of nitrogen oxides to nitrogen and water in emission control technology.

For example, U.S. Pat. No. 4,961,917 describes the use of iron- or copper-doped zeolites in a catalytic process for reduction of nitrogen oxides in the presence of ammonia and oxygen. The catalyst described is a zeolite with a silicon dioxide to aluminum oxide ratio of at least 10. This zeolite has a pore structure which is bonded in all three crystallographic dimensions by pores, which have an average kinetic pore diameter of at least 7 Å. The iron and/or copper promoters are present in an amount of 0.1 to 30% by weight of the total weight of promoter plus zeolite. The zeolite is selected from the group consisting of USY, beta and ZSM-20. The iron or copper sources used are sulfates.

Owing to the harmful effect of nitrogen oxide emissions on the environment, it is an important concern to further reduce these emissions. For the near future, significantly lower $NO_x$ limits for exhaust gases stationary systems and motor vehicles from than the present standard are already envisaged.

The removal of nitrogen from combustion gases is also referred to as $DeNO_x$. In auto technology, selective catalytic reduction (SCR) is one of the most important $DeNO_x$ techniques. The reducing agents used are typically hydrocarbons (HCSCR) or ammonia ($NH_3$—SCR), or $NH_3$ precursors such as urea (Ad-Blue®). In this context, metal-doped zeolites have been found to be very active SCR catalysts which are usable within a wide temperature range.

Customary processes for doping zeolites with metals include, for example, methods such as liquid ion exchange, solid phase ion exchange, vapor phase ion exchange, mechanical-chemical processes, impregnation processes, and the so-called ex-framework processes.

At present, the doping is undertaken predominantly via liquid ion exchange. First, the zeolite material is prepared in a hydrothermal synthesis, crystallized and calcined. The calcination burns off the organic constituents, and the zeolite material is typically obtained in the H or Na form. After the calcination, ammonium ions are exchanged into the zeolite material, the zeolite is calcined again and then the desired metal ions are exchanged in.

Also known is the doping of zeolites with iron by solid-state ion exchange (EP 0 955 080 B1), wherein a mixture of the desired zeolite, a metal compound and an ammonium compound is sintered under a protective gas atmosphere, such that metal-containing catalysts with an increased long-term stability are obtained.

Problems arise especially in the case of doping or introduction of the doping metals into the zeolite, since different oxidation states of these catalytically active metals are often present alongside one another and the desired catalytically active species is not always obtained, or the catalytically active species are converted to catalytically inactive species owing to the reaction conditions of the doping process.

However, it has been found that virtually all known prior art processes form cluster species of the catalytically active metals by metal exchange in the interior of the zeolite, said cluster species being catalytically inactive or lowering the catalytic activity to an extreme degree. In addition, the clusters have an adverse effect on the stability of the zeolite material. The term "cluster" is understood to mean polynuclear bridged or unbridged metal compounds which comprise at least three identical or different metal atoms.

Inactive metal clusters, moreover, lower the pore volume and hinder gas diffusion, or lead to undesired side reactions.

WO 2008/141823 for the first time discloses metal-containing zeolites in which no metal clusters are detectable in the interior of the zeolite framework. It is stated that the metal-exchanged zeolite is free of catalytically inactive or catalytically less active metal clusters, such that only monomeric or dimeric, highly catalytically active metal species are present in the pore structure. These zeolites can be obtained by first preparing an aqueous or water-comprising slurry of a zeolite and then a) increasing the pH of the slurry to a value in the range from 8 to 10, preferably using $NH_4OH$ and with adjustment of the oxygen content in the reaction vessel to a value of <10%, b) lowering the pH to a value in the range from 1.5 to 6, c) adding a metal salt and converting over a period of 1 to 15 hours, d) filtering off and washing the metal-doped zeolite.

A further problem with the aqueous ion exchange is that the metal concentration at the surface is typically higher than in the interior of the zeolite material. Consequently, the aqueous ion exchange leads to an inhomogeneous distribution of the dopant metals in the zeolite material.

A disadvantage of the zeolite doping processes described is, however, that the particular maximum amount of doping metals to be absorbed is limited by the number of cationic positions of the particular zeolites. It follows from this that, for an application which requires a particular amount of dopant metal, not all zeolites are available, but only those which have the desired number of cationic positions. A further disadvantage is that the zeolites which have a higher number of cationic positions and can accordingly absorb a greater amount of dopant metals are less stable (for example after aging) than those with a lower number of cationic positions.

A further disadvantage of the zeolite doping processes described is that these doping processes have many reaction stages, and each reaction stage can damage the zeolite framework and consequently reduce the specific surface area and hence the hydrothermal stability.

It has remained unappreciated to date in the prior art of $DeNO_x$ SCR technology that iron pentacarbonyl is suitable as an iron source in the preparation of iron-doped zeolites.

U.S. Pat. No. 2,533,071 already describes the preparation of metallic iron catalysts by heating of iron pentacarbonyl on a support, such that iron pentacarbonyl decomposes to iron and CO and iron is deposited on the support. The catalyst is used to synthesize hydrocarbons from CO and $H_2$. Synthetic spinels are described as preferred support. Additionally mentioned are compositions composed of, for example, 12.5% silicon oxide and 87.5% aluminum oxide.

In addition, U.S. Pat. No. 4,003,850 describes a process for preparing iron oxide catalysts, wherein a suitable support absorbs iron pentacarbonyl and then the iron pentacarbonyl is oxidized to iron oxide. The support described includes zeolites. The use for reduction of nitrogen oxides from exhaust gases with the aid of carbon monoxide at a pressure of greater than or equal to 1 bar is described. In the examples of U.S. Pat. No. 4,003,850, Alcoa H-151 (activated aluminum oxide), Harshaw AL-1602 (silicon aluminum oxide with 91 $Al_2O_3$, 6 $SiO_2$), Alcoa F-1 4-10 (activated aluminum oxide), Linde 13X (zeolite with $Na_2O.Al_2O_3.2.5SiO_2$) and Hatshaw Fe-0301(iron-containing activated aluminum oxide) are used.

CN 101099932 A describes the preparation of iron-doped catalysts, wherein the iron particles have a particle size of less than 100 nm. The catalysts are prepared using iron pentacarbonyl, which decomposes in situ to iron. Uses specified for these iron-doped catalysts are chemical processes for coal conversion (e.g. coal liquefaction), petroleum refining and ammonia synthesis. The process for preparing these iron-doped catalysts comprises several stages: (i) transferring the catalyst support into an autoclave, placing it under reduced pressure or replacing the air in the autoclave with nitrogen or inert gas; (ii) adding iron pentacarbonyl; (iii) heating up to a temperature and holding at this temperature, at which iron pentacarbonyl evaporates and penetrates into the catalyst support; (iv) further heating or introducing nitrogen or another inert gas by means of high pressure, such that the iron pentacarbonyl present in the support decomposes in situ to iron which has particle sizes in the nanometer range. Possible supports include zeolites, activated carbons, $\gamma$-$Al_2O_3$, kieselguhr and carbon.

WO 98/57743 describes the use of iron-doped zeolites, which have been prepared, inter alia, using iron carbonyls as the iron source, as a catalyst in the conversion of synthesis gas to olefins, especially ethylene, propylene and butene. In the examples, ZSM-5, SAPO-34 and SAPO-17 are used.

In spite of extensive literature in the field of doping of supports via gas phase reaction, no use of this process for the preparation of SCR catalysts has been described to date. Moreover, the potential of the gas phase reaction with regard to a loading with dopant metals going beyond the loading limited by the cationic positions is yet to be discovered.

SUMMARY

One or more embodiments of the present invention relate to an iron-containing zeolite wherein the number of iron sites, based on the zeolite, is greater than the number of cationic positions in the zeolite. Embodiments of the present invention also relate to an iron-containing zeolite preparable by gas phase reaction with iron pentacarbonyl, said zeolite having a greater specific surface area than iron-containing zeolites prepared analogously by ion exchange and/or being more hydrothermally stable than iron-containing zeolites prepared analogously by ion exchange.

One or more embodiments of the present invention also relate to an iron-containing zeolite of the BETA structure, preparable by gas phase reaction with iron pentacarbonyl, wherein the number of iron clusters larger than 10 nm is less than 15% by weight, based on the total amount of iron.

Embodiments of the present invention further relate to a process for preparing an iron-containing zeolitic material, which comprises doping with iron by means of a gas phase reaction using iron pentacarbonyl. One or more embodiments of the present invention also relate to a process for catalytic reduction of nitrogen oxides with addition of ammonia and using catalysts comprising said iron-containing zeolitic material.

DETAILED DESCRIPTION

One or more embodiments of the present invention provide a process which enables doping of zeolites, wherein the amount of dopant metal is independent of the zeolite to be doped, i.e. the cationic positions thereof. One or more embodiments of the present invention also provide an iron-containing zeolitic material which has a high specific surface area and consequently possesses a high hydrothermal stability. In some embodiments, provided is an iron-containing zeolitic material which has a homogeneous distribution of the iron and no iron agglomerates/iron clusters in the zeolitic material. Embodiments of the present invention also relate to an iron-containing zeolitic material which has only minimal deposits of iron outside the pores. Some embodiments of the present invention provide an inexpensive process compared to aqueous ion exchange. According to one or more embodiments, provided is an SCR catalyst which has an improved NOx conversion compared to the prior art.

Zeolite:

Surprisingly, iron-containing zeolites have been found, wherein the number of iron sites, based on the zeolite, is greater than the number of cationic positions in the zeolite.

The present invention also relates to an iron-containing zeolite preparable by gas phase reaction with iron pentacarbonyl, said zeolite having a greater specific surface area than iron-containing zeolites prepared analogously by ion exchange and/or being more hydrothermally stable than iron-containing zeolites prepared analogously by ion exchange.

Iron-Containing Zeolites of the BETA Structure:

The present invention also relates to an iron-containing zeolite of the BETA structure, preparable by gas phase reaction with iron pentacarbonyl, wherein the number of iron clusters larger than 10 nm is less than 15% by weight, based on the total amount of iron.

The number of iron clusters is advantageously less than 10% by weight, preferably less than 5% by weight, even more preferably less than 2% by weight, especially less than 1% by weight, based on the total amount of iron. The number of iron clusters can be performed, for example, with the aid of UV-VIS measurements (e.g. Capek et al., Microporous and Mesoporous Materials 80 (2005) 279-289).

The inventive iron-containing zeolite of the BETA structure advantageously has an iron content of 0.01 to 20% by weight, based on the weight of the BETA, preferably 0.1 to 10% by weight, especially 0.5 to 5% by weight.

The pore diameter of the zeolite of the BETA structure is advantageously between 5 and 10 Å. The iron is advantageously present in the pores of the zeolite.

Process for Preparing the Zeolitic Material:

The present invention further relates to a process for preparing an iron-containing zeolitic material (e.g. iron-containing zeolite of the BETA or CHA structure), which comprises doping with iron by means of a gas phase reaction using iron pentacarbonyl.

The term "zeolite" in the context of the present invention is understood, according to the definition of the International Mineralogical Association (D. S. Coombs et al., Can. Mineralogist, 35, 1997, 1571), to mean a crystalline substance from the group of the aluminum silicates which have a three-dimensional network structure and are of general formula

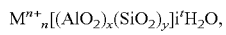

$$M^{n+}{}_n[(AlO_2)_x(SiO_2)_y]\cdot i'H_2O,$$

which consist of $SiO_4/AlO_4$ tetrahedra which are joined by common oxygen atoms to form a regular three-dimensional network. Further configurations can be found, for example, in WO 2008/141823 on pages 5 to 6.

In principle, any zeolitic material can be used in the context of the present invention. Preference is given in accordance with the invention to zeolitic materials with the BETA, BEA, CHA, LEV (for example RUB-50 or ZSM-45), ZSM topologies. Very particular preference is given to zeolitic material of the BETA and CHA topological structures. Advantageously, the zeolites Linde 13X, ZSM-5, SAPO-34 and SAPO-17 are excluded.

Moreover, it is possible in accordance with the invention to use so-called silicoaluminophosphates (SAPOs) which have formed from isomorphously exchanged aluminum phosphates.

The zeolitic material advantageously has a specific BET surface area of 10 to 1000 g/m², preferably 150 to 800 g/m², especially 300 to 700 g/m².

In a zeolitic material comprising silicon and aluminum, the silicon dioxide-aluminum oxide ratio is advantageously greater than 1, preferably 3 to 500, especially 6 to 60.

The zeolites advantageously have a mean pore diameter of 0.2 to 2 nm, preferably 0.3 to 1 nm, especially 0.35 to 0.8 nm.

The process according to the invention is advantageously performed in two component steps, (i) gas phase loading and (ii) thermal decomposition.

The gas phase process (i) is preferably performed as follows:

In the first step (i), gaseous iron pentacarbonyl is flowed through the zeolitic material. The iron pentacarbonyl may advantageously be present in a carrier gas. The carrier gases used are advantageously inert gases such as carbon monoxide, carbon dioxide, nitrogen, helium or argon, or mixtures thereof. Particular preference is given to using carbon monoxide or nitrogen.

The concentration of iron pentacarbonyl in the gas stream is advantageously 0.1 to 100% by volume, preferably 0.5 to 20% by volume, especially 1 to 5% by volume.

The temperature of process step (i) is advantageously 10 to 250° C., preferably 20 to 200° C., especially 50 to 150° C.

The pressure of process step (i) is advantageously 0.1 to 10 bar, preferably 0.5 to 2 bar, especially 0.9 to 1.2 bar, the pressure being measured downstream of the zeolite bed.

The reaction time of process step (i) is advantageously 0.1 min to 10 h, preferably 0.5 min to 5 h, especially 1 to 120 min.

In the second step (ii), hot carrier gas is flowed through the zeolitic material laden with iron pentacarbonyl. The carrier gas used is advantageously air or inert gases such as nitrogen or argon, or mixtures thereof. Particular preference is given to using nitrogen or air.

The temperature of the carrier gas of process step (ii) is advantageously 10 to 500° C., preferably 50 to 400° C., especially 100 to 350° C.

The pressure of process step (ii) (pressure downstream of the zeolite bed) is advantageously 0.1 to 10 bar, preferably 0.5 to 2 bar, especially 0.9 to 1.2 bar.

The reaction time of process step (i) is advantageously 0.1 min to 10 h, preferably 0.5 min to 5 h, especially 1 to 120 min.

For zeolitic material with a pore diameter less than 0.5 to 0.7 nm, there advantageously follows a third step (iii), in which hot carrier gas with a higher temperature than in step (ii) flows through the zeolitic material. This drives iron deposited outside the pores into the pores.

The carrier gas used is steam, air or inert gases, such as nitrogen, helium or argon, or mixtures thereof. Preference is given to using steam, air or nitrogen.

The temperature of process step (iii) is advantageously 500 to 1000° C., preferably 600 to 900° C., especially 650 to 850° C.

The pressure of process step (iii) (pressure downstream of the zeolite bed) is advantageously 0.1 to 10 bar, preferably 0.5 to 2 bar, especially 0.9 to 1.2 bar.

The reaction time of process step (i) is advantageously 1 min to 240 h. Using low temperatures in the range of 500 to 750° C., the reaction time is preferably 1 h to 240 h, especially 2 h to 150 h. Using high temperatures in the range of 750 to 1000° C., the reaction time is preferably 1 min to 150 h, especially 10 min to 100 h.

Use of the Zeolitic Material:

The present invention also relates to the use of the iron-containing zeolitic material prepared in accordance with the invention as a catalyst in transformation reactions of hydrocarbons, in oxidation reactions, in the Fischer-Tropsch reaction and in the selective catalytic reduction of nitrogen oxides.

The selective catalytic reduction of nitrogen oxides is advantageously performed with addition of ammonia or ammonia precursors, for example urea. Advantageously, an iron-containing zeolite of the BETA structure is used as the SCR catalyst.

Advantages:

By virtue of the process according to one or more embodiments of the invention, it is possible to prepare iron-containing zeolitic materials which have an iron content greater than the iron content limited by the cationic positions. In addition, in some embodiments, it is possible to prepare iron-containing zeolitic materials which have a higher specific surface area than iron-containing zeolitic materials prepared analogously via ion exchange reactions. Consequently, the inventive iron-containing zeolites may possess a greater hydrothermal stability. Furthermore, iron-containing zeolitic materials can be prepared with homogeneous and selective distribution of the metal iron in the pores. Furthermore, in some embodiments, no deposition of iron outside the pores is obtained. In addition, compared to conventional wet chemical processes, the preparation can be effected less expensively in the two component steps of gas phase loading and thermal decomposition. In addition, in some embodiments, the inventive iron-containing zeolitic material is notable for a high exhaust gas degradation activity in the DENOX process.

EXAMPLES

1. Preparation of the Iron-Containing Zeolitic Material

Example 1

Loading of Zeolite Beta with 2.4% by Weight of Fe 15 g of zeolite beta were flowed through by a gas stream of 1.2% by volume of iron pentacarbonyl in carbon monoxide at 115° C. and slightly reduced pressure (−15 mbar) for 31 min. Thereafter, the vessel containing the zeolite bed was heated externally to 200° C. and flowed through at slightly reduced pressure (−15 mbar) by argon at 200° C. for 25 min. The catalyst obtained exhibited no deposition of iron outside of the pores in a TEM (transmission electron microscope) analysis. EDX X-ray spectroscopy analyses show homogeneous distribution of the iron on the zeolite support.

Example 2

Loading of Zeolite Beta with 1.6% by Weight of Fe 14 g of zeolite beta were flowed through by a gas stream at 150° C. composed of 1.2% by volume of iron pentacarbonyl in argon at slightly reduced pressure (−15 mbar) for 31 min. In this experiment, the vessel containing the zeolite bed was heated externally to 200° C. from the start. Thereafter, the bed was flowed through directly at slightly reduced pressure (−15 mbar) by argon at 200° C. for 28 min.

Example 3

Loading of Zeolite Beta with 5% by Weight of Fe 12 g of zeolite beta was flowed through by a gas stream composed of 1.2% by volume of iron pentacarbonyl in carbon monoxide at 115° C. and slightly reduced pressure (−15 mbar) for 27 min. Thereafter, the vessel containing the zeolite bed was heated externally to 200° C. and flowed through at slightly reduced pressure (−15 mbar) by argon at 200° C. for 22 min. The

Example 4

Loading of Chabazite SSZ-13 with 1.4% by Weight of Fe 11 g of zeolite beta were flowed through by a gas stream composed of 1.2% by volume of iron pentacarbonyl in carbon monoxide at 115° C. and slightly reduced pressure (−15 mbar) for 31 min. Thereafter, the vessel containing the zeolite bed was heated externally to 200° C. and flowed through at slightly reduced pressure (−15 mbar) by argon at 200° C. for 22 min. The catalyst was subsequently treated at 700° C. with steam for 48 h.

2. Catalytic Test

The conversion was determined with the aid of a gas mixture of 500 ppm of NO, 500 ppm of $NH_3$, 10% $O_2$, 5% $H_2O$ in He with volume-based gas hourly space velocity (GH) 80 000 $h^{-1}$ through a powder bed in an oven. The reference catalyst used was a zeolite beta prepared by means of ion exchange by the standard method, with 1.4% by weight of Fe and 0.15% by weight of $CeO_2$. The results are shown in table 1.

TABLE 1

|  | Conversion at 200° C. [%] | Conversion at 400° C. [%] | Conversion at 500° C. [%] |
|---|---|---|---|
| Reference | 13 | 49 | 42 |
| Example 1 | 22 | 58 | 57 |
| Example 2 | 27 | 62 | 62 |
| Example 3 | 26 | 62 | 61 |
| Example 4 | 18 | 48 | 45 |

3. Stability Comparison of Iron-Containing Zeolitic Material

The specific surface area (i) of an iron-containing beta prepared via gas phase reaction (1.2% by weight of Fe) and (ii) of an iron-containing beta prepared via ion exchange reaction (1.5% by weight of Fe) was determined after aging at 750° C. with 10% steam for 24 hours (DIN 66135).

|  | Langmuir [$m^2/g$] after aging |
|---|---|
| (i) Iron-containing beta via gas phase reaction | 714.3 |
| (ii) Iron-containing beta via ion exchange reaction | 610.6 |

The invention claimed is:

1. A process for preparing an iron-containing zeolitic material comprising a topology selected from the group consisting of BEA, CHA, and LEV, the method comprising doping a starting zeolitic material with iron by a gas phase reaction comprising:
   (i) gas phase loading by flowing iron pentacarbonyl through the starting zeolitic material to provide a zeolitic material laden with iron pentacarbonyl;
   (ii) thermal decomposition of the zeolitic material laden with iron pentacarbonyl to provide an iron-containing zeolitic material; and
   (iii) flowing steam, air or an inert gas through the iron-containing zeolitic material at temperatures of 500 to 1000° C. at a pressure of 0.1 to 10 bar.

2. The process according to claim 1, wherein, in component step (i), gaseous iron pentacarbonyl at a concentration of iron pentacarbonyl in the gas stream of 0.1 to 100% by volume is flowed through the starting zeolitic material at a temperature of 10 to 250° C. and a pressure of 0.1 to 10 bar for a period of 0.1 min to 10 h.

3. The process according to claim 1, wherein, in component step (ii), a gas selected from the group consisting of at least one inert gas, air and combinations thereof is flowed through the zeolitic material laden with iron pentacarbonyl, the temperature in step (ii) being 10 to 500° C., the pressure 0.1 to 10 bar and the reaction time 0.1 min to 10 h.

4. The process according to claim 1, wherein the starting zeolitic material has a pore diameter less than 0.7 nm.

5. The process according to claim 1, wherein the iron-containing zeolitic material comprises a topology selected from the group consisting of CHA and LEV.

6. The process according to claim 1, wherein the starting zeolitic material has a specific BET surface area of 10 to 1000 $g/m^2$.

7. The process according to claim 1, wherein the starting zeolitic material has a specific BET surface area of 150 to 800 g/m$^2$.

8. The process according to claim 1, wherein the starting zeolitic material has a specific BET surface area of 300 to 700 g/m$^2$.

9. The process according to claim 1, wherein the starting zeolitic material comprises a silicon dioxide-aluminum oxide ratio greater than 1.

10. The process according to claim 1, wherein the starting zeolitic material comprises a silicon dioxide-aluminum oxide ratio of 3 to 500.

11. The process according to claim 1, wherein the starting zeolitic material comprises a silicon dioxide-aluminum oxide ratio of 6 to 60.

12. The process according to claim 1, wherein the starting zeolitic material has a mean pore diameter of 0.2 to 2 nm.

13. The process according to claim 1, wherein the starting zeolitic material has a mean pore diameter of 0.3 to 1 nm.

14. The process according to claim 1, wherein the starting zeolitic material has a mean pore diameter of 0.35 to 0.8 nm.

15. The process according to claim 5, wherein the iron-containing zeolitic material comprises a CHA topology, and steam is flowed through the iron-containing zeolitic material in step (iii).

* * * * *